E. C. HITZE.
RELIEF VALVE.
APPLICATION FILED MAY 18, 1918.

1,321,527.

Patented Nov. 11, 1919.
2 SHEETS—SHEET 1.

Witness:
G. Burkhardt.

Inventor.
Edward C. Hitze.
By Albert E. Bell
Atty.

E. C. HITZE.
RELIEF VALVE.
APPLICATION FILED MAY 18, 1918.

1,321,527.

Patented Nov. 11, 1919.
2 SHEETS—SHEET 2.

Witness:
R. Burkhardt.

Inventor:
Edward C. Hitze
By Albert C. Bell
Atty.

UNITED STATES PATENT OFFICE.

EDWARD C. HITZE, OF CHICAGO, ILLINOIS, ASSIGNOR TO EDWARD VALVE AND MANUFACTURING COMPANY, OF CHICAGO, ILLINOIS, A CORPORATION OF ILLINOIS.

RELIEF-VALVE.

1,321,527.  Specification of Letters Patent.  Patented Nov. 11, 1919.

Application filed May 18, 1918. Serial No. 235,228.

*To all whom it may concern:*

Be it known that I, EDWARD C. HITZE, a citizen of the United States, residing at Chicago, in the county of Cook and State of Illinois, have invented a certain new and useful Improvement in Relief-Valves, of which the following is a specification.

My invention relates to an improved construction of pressure relief valves, or back pressure valves intended for use particularly where the back pressure operating on the valve is of a considerable amount.

Heretofore, if the pressure relief valves have properly been constructed, in which the valves are held in their closed position by weighted levers, this type of valve has been found satisfactory where the back pressure is low and the diameter of the valve openings is relatively small. With modern developments in steam engineering, however, there is a growing demand for large steam units and installations in which pressure relief valves must be employed to withstand back pressures up to 80 or 100 lbs. per square inch, or even more, and where this condition obtains, particularly in connection with large diameter pipes to supply the requisite quantity of steam, it is prohibitive to employ a simple weighted lever construction on account of the enormous dimensions and weights that would be required.

My invention relates particularly to pressure relief valves for high back pressure and large volume relief and it is characterized by providing a construction in which the back pressure itself, by means of a counter-balancing piston, or pistons counteracts a large part of the back pressure, thus permitting the use of a weight in connection with the lever sufficient only to counter-balance the difference between the pressure on the relief valve proper and the counteracting pressure on the piston associated therewith, without however reducing the area of outlet afforded to the steam when the relief valve is opened.

A further feature of my invention consists in dividing the relief valve proper into two parts so that the area of each part may be much less than would be required if a single valve were employed to afford the relief opening necessary to secure the intended results. By reducing the size of the relief valves in this manner, I am able to construct the valves with greater accuracy and with greater ease than would be the case if the relief valves were of large diameter.

In connection with modern steam engineering, relief valves are frequently required for use with large diameter pipes, say for example, up to 3 ft. or 3½ ft. in diameter, and to afford a proper relief for the steam in such a pipe with back pressures of from 80 to 100 lbs. If the relief valve were of the simple weighted lever type, the lever would necessarily be many feet long and the weight required would run into tons, or in other words, the large dimensions required would make the practical construction of such a relief valve prohibitive. Furthermore, for the diameter referred to, if a single relief valve were employed, the diameter of the valve would necessarily be 3 ft. or 3½ ft. and the construction of a valve of that diameter would be such an accurate matter that its cost would be prohibitive and it would not to be certain to operate uniformly when it began to wear.

For a construction of the kind under consideration, by means of my invention I counterbalance the greater part of the back pressure, and find it necessary to use a lever of but relatively short length, say for example, four to five feet, and a counterweight of not over 200 or 300 lbs., or in other words, the size of the lever and counter-weight are well within the space available for the installation of valves of this kind.

Furthermore, by dividing the relief valve proper into two parts, each part is required to afford but half the area of relief opening that would be required if the valve were provided with but a single relief member, and the constructing of the valve members of smaller diameter may be done much more readily to secure the necessary accuracy than if the larger valve members were required.

My invention will best be understood by reference to the accompanying drawings showing a preferred embodiment thereof, in which—

Similar numerals refer to similar parts throughout the several views.

Figure 1:
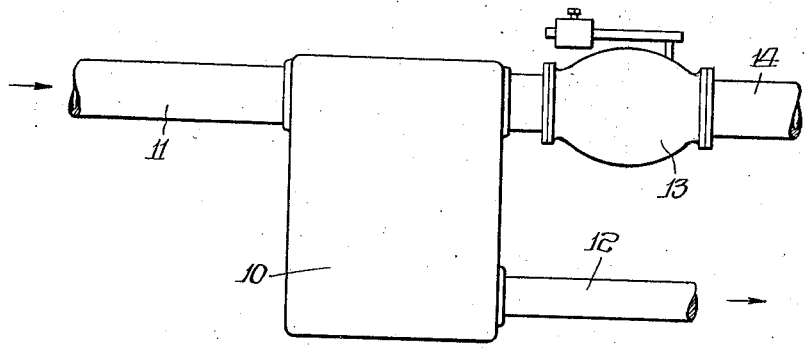
Figure 1 is a diagrammatic view showing the connection of a pressure relief valve to a condenser.

As shown in Fig. 1 a condenser is shown diagrammatically at 10 and to the condenser there is connected a steam supply pipe 11 and a discharge pipe 12. The pressure relief valve 13 is connected to the upper portion of the condenser and serves the purpose when it operates of relieving any excess pressure which may be produced in the condenser by discharging it through the pipe 14 to the atmosphere. This condition may occur, if for example the pumps connected with the discharge pipe 12, and not shown in the drawings fail to operate and thus fail to maintain the relatively low pressure for which the condenser is designed, the condenser not being able to withstand the higher pressures that are developed when the discharge pipe 12 does not function for any reason and it is necessary to relieve the increased pressure and the pressure relief valve is therefore employed.

Figure 2:
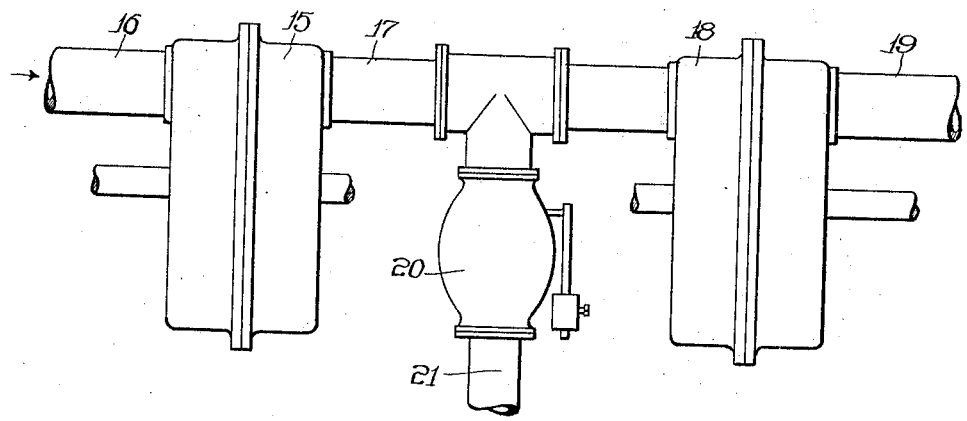
Fig. 2 is a diagrammatic view showing the use of a pressure relief valve in connection with two steam tubines.

In the arrangement shown diagrammatically in Fig. 2 the first steam turbine 15 is arranged to receive steam under high pressure through a pipe 16 and deliver its exhaust steam into a pipe 17 to a low pressure turbine 18 from which the steam is delivered through a pipe 19 to a condenser, or to the atmosphere as desired. The pressure in the pipe 16 may be from 200 to 300 lbs. per square inch, which pressure is dissipated in large part in the production of work in the turbine 15, and as a result the pressure in the pipe 17 may be not to exceed 80 to 100 lbs. per square inch, for which pressure the low pressure turbine 18 is designed to operate. If for any reason the operation of the turbine 15 is interrupted while the pressure in the pipe 16 is maintained, just to the extent that the turbine ceases to function the pressure in the pipe 17 is built up, and since the turbine 18 is not designed to stand high pressure, the excess pressure must be relieved to protect the turbine 18 and a pressure relief valve 20 is connected with the pipe 17 to open under the excess pressure and discharge the steam through pipe 21 to the atmosphere.

With installations of the kind under consideration large size units are frequently employed requiring that the pipes shall be of large diameter, say from 3 to 4 ft., and as a result serious problems are involved in constructing pressure relief valves that will properly protect the mechanism.

Figure 3:
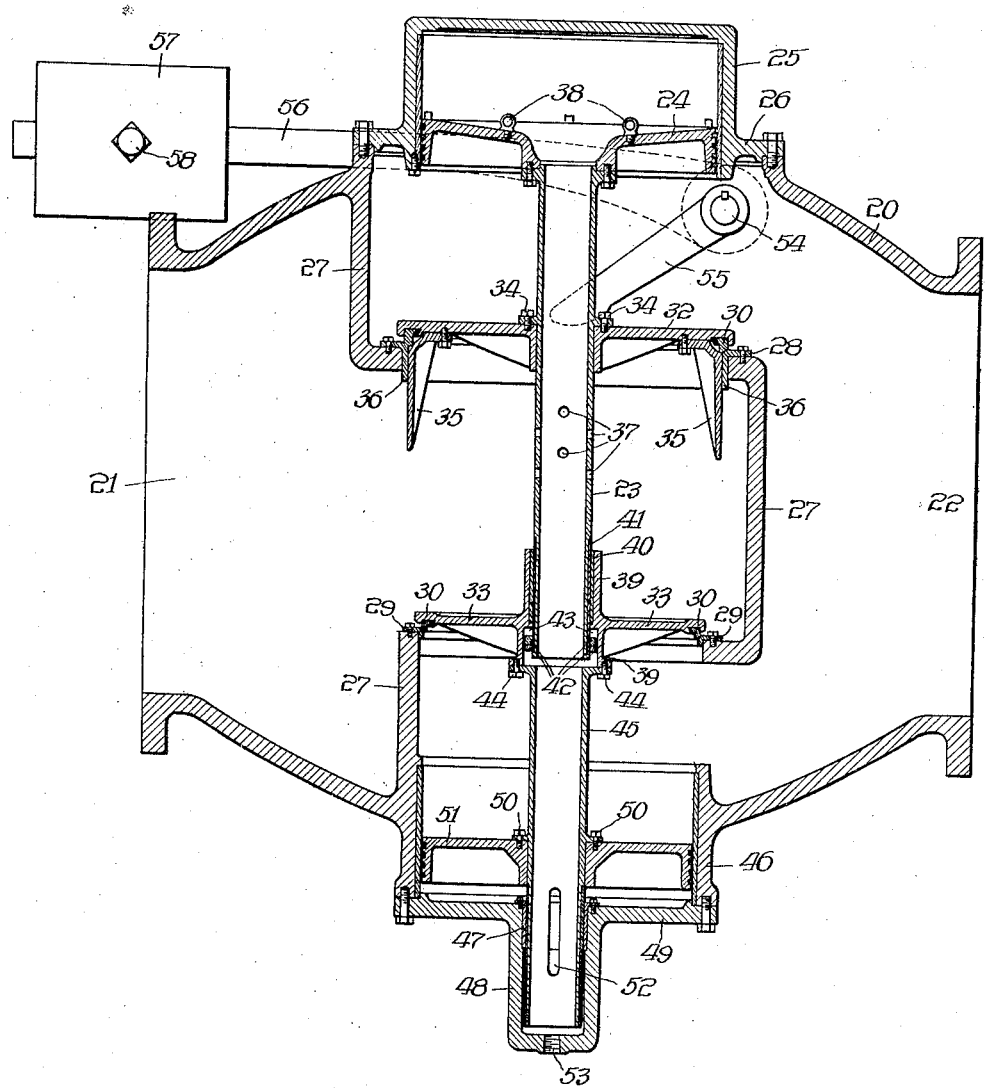
Fig. 3 shows a longitudinal sectional view on an enlarged scale of my improved relief valve construction.

As shown in Fig. 3, the valve casing 20 is provided with an inlet opening 21 and an outlet opening 22, between which a hollow valve rod 23 is disposed at substantially right angle to the axis of the casing 20. The upper end of the rod 23 has rigidly secured thereto a piston 24 located in a cylinder 25 carried by the cap 26 employed to inclose the valve mechanism and permit its assembly within the casing 20. An integral partition 27 extends from the left hand edge of the cap 26, first in a direction substantially parallel with the axis of the rod 23, then at right angles to the axis of said rod, and in a direction toward the outlet opening 22, then again in the first direction and on the other side of the rod 23 toward the lower wall of the casing 20, then at right angles to the rod 23 toward the supply opening of the casing 20, and then substantially parallel with the axis of the rod 23 to the lower side of the casing 20. The two portions of the partition 27 which are at right angles to the axis of the rod 23, have large diameter openings formed in them in which are mounted valve seats 28 and 29 engaged by valve rings 30 and 31 carried by the valve disks 32 and 33 respectively.

The disk 32 is rigidly secured to the rod 23 by the cap screws 34, as a result of which the piston 24 and valve ring 30 move together in the same direction when there is any movement of the valve disk 32. The disk 32 has secured thereto a plurality of guiding arms 35 engaging a tubular flange 36 extending from the valve seat 28 through the opening formed in the partition 27 to receive the same, to maintain the valve ring 30 in centered relation to the valve seat 28 and also to support the lower portion of the rod 23. The disk 32 and valve ring 30 thus serve to prevent communication between the two ends of the valve casing through the upper portion of partition 27 when the disk and valve ring are in their lower position. The piston 24 is provided with a central aperture in communication with the interior of the tubular bar 23 and a plurality of openings 37 is formed through the wall of the tubular bar below the disk 32 to communicate the pressure inside of the casing 20 to the left of the partition 27 to the inside of the tubular bar and thus to the cylinder 25 above the piston 24. The piston 24 is provided with eyes 38 secured to its upper surface to facilitate the assembling of the valve parts and remove them when required.

The disk 33 is provided with an upwardly extending hub 39 having a bushing 40, which is a sliding fit on a bearing sleeve 41 carried by the lower portion of the rod 23. The lower end of the rod 23 extends nearly to the lower end of the hub 39 and is threaded and provided with lock nuts 42 for lifting disk 33 in the manner to be described. The lower portion of the hub 39 is counterbored as indicated at 43 to clear the lock nuts 42 and provide that a desired amount of vertical motion may be imparted to the rod 23 and parts carried thereby without motion of the disk 33. When the rod 23 is moved a greater amount in an upward direction, however, the upper one of the lock nuts 42 engages the end of the counter-bore 43 and raises the disk 33 and the parts rigidly secured thereto.

The lower end of the hub 39 has rigidly secured thereto by means of cap screws 44, the upper end of a second tubular bar 45 which extends downwardly in axial alinement with the bar 23 through a cylinder 46 concentrically disposed around the bar 45 and formed in the lower wall of the casing 20 into a vertical bearing sleeve 47 mounted in an extension 48 on the lower cap 49 of the casing. The bar 45 has rigidly secured thereto by means of cap screws 50, a piston 51 located in the cylinder 46 and below the piston 51, the bar 45 has one or more slots 52 formed through its wall affording communication between the inside of the bar 23 and the portion of the cylinder 46 between the piston 51 and the cap 49.

The extension 48 is provided at its lower end with a threaded aperture 53 for receiving a suitable pipe connection to drain from the valve any water that may condense, and flow downwardly into the projecting portion 48.

The upper portion of the casing 20 to the right of the bar 23 has extending horizontally across it a shaft 54, to which there is secured inside of the casing a lever, or levers 55, which extend downwardly and to the left and at their lower ends rest on the upper surface of the disk 32. The shaft 54 extends through the casing 20, and at its outer end has rigidly secured thereto one end of the lever 56, on the other end of which a counter-weight 57 is mounted, which counter-weight may be secured in any desired position on the lever by a clamping screw 58.

As indicated in Fig. 3, the diameter of the valve seat 28 is slightly larger than the diameter of the piston 24, and since the disk 32 and piston 24 are rigidly secured together, and the unit pressure below the disk 32 is equal to the unit pressure above the piston 24, the resultant lifting force exerted on the lower end of the levers 55, as far as the disk 32 and the piston 24 are concerned, is the difference between the total pressures exerted upwardly upon the disk and downwardly upon the piston, or in other words, the turning motion exerted by the counter-weight 57, need only be great enough to balance this difference in pressure, assuming that the remaining portions of the valve construction do not disturb the differential relation referred to.

The diameter of the valve seat 29 is substantially the same as the diameter of the piston 51, as a result of which the downward pressure exerted upon the disk 33 practically counterbalances the upward pressure exerted upon the piston 51, and for this relation the size of the lever 56 and the weight of the counterweight 57 may be determined from the relation of the sizes of the piston 24 and valve seat 28. Other proportions between the valve seat 29 and the piston 51 may be taken if desired, that is to say, by making the valve seat 29 somewhat larger in diameter than the piston 51, the difference between the total pressures upon the disk 33 and the piston 51 must be counterbalanced by the weight 57, as well as the difference between the total pressure on the disk 32 and the piston 24; on the other hand, the valve seat 29 may be slightly smaller than the piston 51, in some cases so that the total pressure on the under surface of the piston 51 is greater than the downward pressure of the disk 33, or in other words so that the pressure on the piston 51 tends to support to a desired degree the weight of the moving parts of the valve mechanism.

It is to be observed that the lower surface of the piston 24, the upper surface of the piston 51, the upper surface of the disk 33 32 and the lower surface of the disk 33 are in communication with the outlet opening 22 of the casing 20 at all times and are therefore subjected to atmospheric pressure, which permits the differential action due to the steam pressure in the other part of the valve casing as described.

The important advantage secured by having the valve seat 29 and the piston 51 of substantially the same diameter is that for some conditions a relatively small increase in the back pressure in the supply portion of the valve casing may overcome the effect of the counter-weight 57 and raise the disk 32 sufficiently to prevent the further building up of the back pressure without disturbing the disk 33 and the parts rigidly secured thereto. Where, on the other hand, the disturbance leading to the increasing of the back pressure is of such a nature as to require the full capacity of the relief valve, the disk 32 is moved farther in an upward direction so as to afford the full area of discharge opening through the valve seat 28, which serves also to raise the disk 33 and thus afford a further relief opening through the valve seat 29. The amount of opening of the relief valve, and whether one or both of the portions of said valve are moved from their seats is determined of course by the amount of back pressure and the rate at which it is built up by the cause producing it.

While I have shown my invention in the particular embodiments above described, it will be understood that I do not limit myself to this exact construction, as I may employ equivalents thereof known to the art at the time of the filing of this application without departing from the scope of the appended claims.

What I claim is:

1. In a pressure relief valve, the combination of a valve casing having inlet and outlet openings, a valve member controlling flow of fluid through said casing, a piston rigidly connected to said valve member and of different diameter from the diameter of said valve member, means for subjecting said valve member and piston differentially to the pressure in the inlet portion of said casing tending to move said valve member to its open position, counterbalancing mechanism for holding said valve member closed against said differential action, a second valve member also controlling flow of fluid through said casing, and devices connecting said valve members for simultaneous operation, the combined effective areas of said valve members being substantially equal to the area of said inlet or said outlet opening.

2. In a pressure relief valve, the combination of a valve casing having inlet and outlet openings, a valve member controlling flow of fluid through said casing, a piston rigidly connected to said valve member and of different diameter from the diameter of said valve member, means for subjecting said valve member and piston differentially to the pressure in the inlet portion of said casing tending to move said valve member to its open position, counterbalancing mechanism for holding said valve member closed against said differential action, a second valve member also controlling flow of fluid through said casing, devices connecting said valve members for simultaneous operation, the combined effective areas of said valve members being substantially equal to the area of said inlet or said outlet opening, said connecting devices permitting motion of said first mentioned valve member to partly open the same before said second valve member is moved from its closed position.

3. In a pressure relief valve, the combination of a valve casing having inlet and outlet openings, a valve member controlling flow of fluid through said casing, a piston rigidly connected to said valve member and of different diameter from the diameter of said valve member, means for subjecting said valve member and piston differentially to the pressure in the inlet portion of said casing tending to move said valve member to its open position, counterbalancing mechanism for holding said valve member closed against said differential action, a second valve member also controlling flow of fluid through said casing, and devices connecting said valve members for simultaneous operation, the combined effective areas of said valve members being substantially equal to the area of said inlet or said outlet opening, a second piston of substantially the diameter of said second valve member rigidly secured thereto, and means for subjecting said second piston to the pressure in the inlet portion of said casing in a direction tending to open said second valve member.

4. In a pressure relief valve, the combination of a valve casing having inlet and outlet openings, a valve member controlling flow of fluid through said casing, a piston rigidly connected to said valve member and of different diameter from the diameter of said valve member, means for subjecting said valve member and piston differentially to the pressure in the inlet portion of said casing tending to move said valve member to its open position, counterbalancing mechanism for holding said valve member closed against said differential action, a second valve member also controlling flow of fluid through said casing, devices connecting said valve members for simultaneous operation, the combined effective areas of said valve members being substantially equal to the area of said inlet or said outlet opening, said connecting devices permitting motion of said first mentioned valve member to partly open the same before said second valve member is moved from its closed position, a second piston of substantially the diameter of said second valve member rigidly secured thereto, and means for subjecting said second piston to the pressure in the inlet portion of said casing in a direction tending to open said second valve member.

5. In a pressure relief valve, the combination of a casing having inlet and outlet openings, a partition extending across said casing between said openings, a valve seat in said partition, a valve disk for engaging said seat, a piston substantially parallel with said valve disk, a cylinder carried by said casing and containing said piston, said piston being of different diameter from said valve disk, a hollow rod rigidly connecting said valve disk and piston, a weighted lever outside of said casing, devices extending from said lever to said valve disk tending to hold said valve disk in its closed position, a second valve seat in said partition, a second valve disk for engaging said second valve seat, a second piston substantially equal in diameter to said second valve disk and parallel therewith, a second cylinder carried by the casing and containing said second piston, a second hollow rod rigidly connecting said second piston and said second valve disk, and devices connecting said rods, whereby operation of said first rod during the opening of said first valve disk, operates said second rod to open said second valve disk.

6. In a pressure relief valve, the combination of a casing having inlet and outlet openings, a partition extending across said casing between said openings, a valve seat in said partition, a valve disk for engaging said seat, a piston substantially parallel with said valve disk, a cylinder carried by said casing and containing said piston, said piston being of different diameter from said valve disk, a hollow rod rigidly connecting said valve disk and piston, a weighted lever outside of said casing, devices extending from said lever to said valve disk tending to hold said valve disk in its closed position, a second valve seat in said partition, a second valve disk for engaging said second valve seat, a second piston substantially equal in diameter to said second valve disk and parallel therewith, a second cylinder carried by the casing and containing said second piston, a second hollow rod rigidly connecting said second piston and said second valve disk, and devices connecting said rods, whereby operation of said first rod during the opening of said first valve disk, operates said second rod to open said second valve disk, said connecting devices permitting partial opening of said first valve disk without moving said second valve disk from its closed position.

7. In a pressure relief valve, the combination of a casing having inlet and outlet openings, a partition extending across said casing between said openings, a valve seat in said partition, a valve disk for engaging said seat, a piston substantially parallel with said valve disk, a cylinder carried by said casing and containing said piston, said piston being of different diameter from the diameter of said valve disk, a hollow rod rigidly connecting said valve disk and piston, a weighted lever outside of said casing, devices extending from said lever to said valve disk tending to hold said valve disk in its closed position, a second valve seat in said partition, a second valve disk for engaging said second valve seat, a second piston substantially equal in diameter to said second valve disk and parallel therewith, a second cylinder carried by the casing and containing said second piston, a second hollow rod rigidly connecting said second piston and said second valve disk, and devices connecting said rods, whereby operation of said first rod during the opening of said first valve disk, operates said second rod to open said second valve disk, said connecting devices permitting partial opening of said first valve disk without moving said second valve disk from its closed position, said rods being in axial alinement and said second valve disk carrying a supporting guide for said first rod.

8. In a pressure relief valve, the combination of a casing having inlet and outlet openings, a partition extending across said casing between said openings, a valve seat in said partition, a valve disk for engaging said seat, a piston substantially parallel with said valve disk, a cylinder carried by said casing and containing said piston, said piston being of different diameter from the diameter of said valve disk, a hollow rod rigidly connecting said valve disk and piston, a weighted lever outside of said casing, devices extending from said lever to said valve disk tending to hold said valve disk in its closed position, a second valve seat in said partition, a second valve disk for engaging said second valve seat, a second piston substantially equal in diameter to said second valve disk and parallel therewith, a second cylinder carried by the casing and containing said second piston, a second hollow rod rigidly connecting said second piston and said second valve disk, and devices connecting said rods, whereby operation of said first rod during the opening of said first valve disk, operates said second rod to open said second valve disk, said connecting devices permitting partial opening of said first valve disk without moving said second valve from its closed position, said connecting devices comprising in part threaded devices movable to change the amount of said partial opening of said first valve disk before said second valve disk is moved from its closed position.

9. In a pressure relief valve, the combination of a casing having inlet and outlet openings, a valve seat in said casing, a valve member in said casing for engaging said valve seat to prevent communication between said openings, said casing and valve member being made to withstand high back pressure and permit large volume flow, a piston of smaller diameter than said valve member and connected therewith, a cylinder carried by said casing for containing said piston, means for communicating fluid pressure in the inlet end of said casing to said piston in a direction tending to hold said valve member against said seat against the pressure in said inlet end, devices for exerting a holding force upon said valve member substantially equal to the difference between the fluid pressures on said valve member and piston, a second valve member also controlling flow of fluid through said casing, and devices connecting said valve members for simultaneous operation, the combined effective areas of said valve members being substantially equal to the area of said inlet or said outlet opening.

10. In a pressure relief valve, the combination of a casing having inlet and outlet openings, a valve seat in said casing, a valve member in said casing for engaging said valve seat to prevent communication between said openings, said casing and valve member being made to withstand high back pressure and permit large volume flow, a piston of smaller diameter than said valve member and connected therewith, a cylinder carried by said casing for containing said piston, means for communicating fluid pressure in the inlet end of said casing to said piston in a direction tending to hold said valve member against said seat against the pressure in said inlet end, devices for exerting a holding force upon said valve member substantially equal to the difference between the fluid pressures on said valve member and piston, a second valve member also controlling flow of fluid through said casing, devices connecting said valve members for simultaneous operation, the combined effective areas of said valve members being substantially equal to the area of said inlet or said outlet openings, said connecting devices permitting motion of said first mentioned valve member to partly open the same before said second valve member is moved from its closed position.

11. In a pressure relief valve, the combination of a casing having inlet and outlet openings, a valve seat in said casing, a valve member in said casing for engaging said valve seat to prevent communication between said openings, said casing and valve member being made to withstand high back pressure and permit large volume flow, a piston of smaller diameter than said valve member and connected therewith, a cylinder carried by said casing for containing said piston, means for communicating fluid pressure in the inlet end of said casing to said piston in a direction tending to hold said valve member against said seat against the pressure in said inlet end, devices for exerting a holding force upon said valve member substantially equal to the difference between the fluid pressures on said valve member and piston, a second valve member also controlling flow of fluid through said casing, devices connecting said valve members for simultaneous operation, the combined effective areas of said valve members being substantially equal to the area of said inlet or said outlet opening, a second piston of substantially the diameter of said second valve member rigidly secured thereto, and means for subjecting said second piston to the pressure in the inlet portion of said casing in a direction tending to open said second valve member.

12. In a pressure relief valve, the combination of a casing having inlet and outlet openings, a valve seat in said casing, a valve member in said casing for engaging said valve seat to prevent communication between said openings, said casing and valve member being made to withstand high back pressure and permit large volume flow, a piston of smaller diameter than said valve member and connected therewith, a cylinder carried by said casing for containing said piston, means for communicating fluid pressure in the inlet end of said casing to said piston in a direction tending to hold said valve member against said seat against the pressure in said inlet end, devices for exerting a holding force upon said valve member substantially equal to the difference between the fluid pressures on said valve member and piston, a second valve member also controlling flow of fluid through said casing, devices connecting said valve members for simultaneous operation, the combined effective areas of said valve members being substantially equal to the area of said inlet or said outlet opening, a second piston of substantially the diameter of said second valve member rigidly secured thereto, means for subjecting said second piston to the pressure in the inlet portion of said casing in a direction tending to open said second valve member, said connecting devices permitting motion of said first mentioned valve member to partly open the same before said second valve member is moved from its closed position.

13. In a pressure relief valve, the combination of a casing having inlet and outlet openings, a valve seat in said casing, a valve member in said casing for engaging said valve seat to prevent communication between said openings, said casing and valve member being made to withstand high back pressure and permit large volume flow, a piston of smaller diameter than said valve member and connected therewith, a cylinder carried by said casing for containing said piston, a hollow rod rigidly connecting said piston and valve member and forming a communicating passageway between the inlet portion of said casing and the inside of said cylinder, devices for exerting a holding force upon said valve member substantially equal to the difference between the fluid pressures on said valve member and piston, a second valve seat in said casing, a second valve member for engaging said second valve seat, a second piston substantially equal in diameter to said second valve member and parallel therewith, a second cylinder carried by the casing and containing said second piston, a second hollow rod rigidly connecting said second piston and said second valve member, and devices connecting said rods, whereby operation of said first rod during the opening of said first valve member, operates said second rod to open said second valve member.

14. In a pressure relief valve, the combination of a casing having inlet and outlet openings, a valve seat in said casing, a valve member in said casing for engaging said valve seat to prevent communication between said openings, said casing and valve member being made to withstand high back pressure and permit large volume flow, a piston of smaller diameter than said valve member and connected therewith, a cylinder carried by said casing for containing said piston, a hollow rod rigidly connecting said piston and valve member and forming a communicating passageway between the inlet portion of said casing and the inside of said cylinder, devices for exerting a holding force upon said valve member substantially equal to the difference between the fluid pressures on said valve member and piston, a second valve seat in said casing, a second valve member for engaging said second valve seat, a second piston substantially equal in diameter to said second valve member and parallel therewith, a second cylinder carried by the casing and containing said second piston, a second hollow rod rigidly connecting said second piston and said second valve member, and devices connecting said rods, whereby operation of said first rod during the opening of said first valve member, operates said second rod to open said second valve member, said connecting devices permitting partial opening of said first valve member without moving said second valve member from its closed position.

15. In a pressure relief valve, the combination of a casing having inlet and outlet openings, a valve seat in said casing, a valve member in said casing for engaging said valve seat to prevent communication between said openings, said casing and valve member being made to withstand high back pressure and permit large volume flow, a piston of smaller diameter than said valve member and connected therewith, a cylinder carried by said casing for containing said piston, a hollow rod rigidly connecting said piston and valve member and forming a communicating passageway between the inlet portion of said casing and the inside of said cylinder, devices for exerting a holding force upon said valve member substantially equal to the difference between the fluid pressures on said valve member and piston, a second valve seat in said casing, a second valve member for engaging said second valve seat, a second piston substantially equal in diameter to said second valve member and parallel therewith, a second cylinder carried by the casing and containing said second piston, a second hollow rod rigidly connecting said second piston and said second valve member, and devices connecting said rods, whereby operation of said first rod during the opening of said first valve member, operates said second rod to open said second valve member, said connecting devices permitting partial opening of said first valve member without moving said second valve member from its closed position, said rods being in axial alinement and said second valve member forming a supporting guide for said first rod.

16. In a pressure relief valve, the combination of a casing having inlet and outlet openings, a valve seat in said casing, a valve member in said casing for engaging said valve seat to prevent communication between said openings, said casing and valve member being made to withstand high back pressure and permit large volume flow, a piston of smaller diameter than said valve member and connected therewith, a cylinder carried by said casing for containing said piston, a hollow rod rigidly connecting said piston and valve member and forming a communicating passageway between the inlet portion of said casing and the inside of said cylinder, devices for exerting a holding force upon said valve member substantially equal to the difference between the fluid pressures on said valve member and piston, a second valve seat in said casing, a second valve member for engaging said second valve seat, a second piston substantially equal in diameter to said second valve member and parallel therewith, a second cylinder carried by the casing and containing said second piston, a second hollow rod rigidly connecting said second piston and said second valve member and devices connecting said rods, whereby operation of said first rod during the opening of said first valve member, operates said second rod to open said second valve member, said connecting devices permitting partial opening of said first valve member without moving said second valve member from its closed position, said rods being in axial alinement and said second valve member carrying a supporting guide for said first rod, said connecting devices comprising in part lock nuts on said first rod for limiting the amount of its motion independently of said second valve member.

In witness whereof, I hereunto subscribe my name this 3rd day of May A. D. 1918.

EDWARD C. HITZE.